Figure 1:
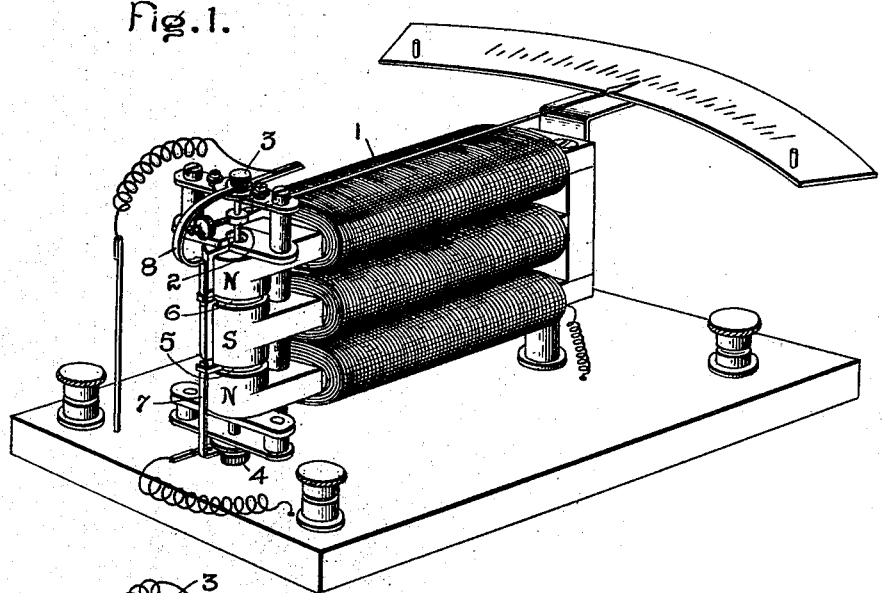

No. 716,103. Patented Dec. 16, 1902.
R. H. READ.
ELECTRIC MEASURING INSTRUMENT.
(Application filed May 20, 1901.)
(No Model.) 2 Sheets—Sheet 1.

Witnesses:
Marcus L. Byng
Benjamin B. Hull

Inventor:
Robert H. Read,
by Albert G. Davis
Atty.

No. 716,103. Patented Dec. 16, 1902.
R. H. READ.
ELECTRIC MEASURING INSTRUMENT.
(Application filed May 20, 1901.)
(No Model.) 2 Sheets—Sheet 2.

Witnesses:
Marcus L. Byng
Benjamin B. Hull

Inventor:
Robert H. Read,
by Albert G. Davis
Att'y.

UNITED STATES PATENT OFFICE.

ROBERT H. READ, OF SCHENECTADY, NEW YORK, ASSIGNOR TO GENERAL ELECTRIC COMPANY, A CORPORATION OF NEW YORK.

ELECTRIC MEASURING INSTRUMENT.

SPECIFICATION forming part of Letters Patent No. 716,103, dated December 16, 1902.

Application filed May 20, 1901. Serial No. 60,991. (No model.)

*To all whom it may concern:*

Be it known that I, ROBERT H. READ, a citizen of the United States, residing at Schenectady, county of Schenectady, State of New York, have invented certain new and useful Improvements in Electrical Measuring Instruments, (Case No. 1,671,) of which the following is a specification.

This invention relates to electrical measuring instruments, the object being to provide an instrument for measuring electric currents cheap in construction, accurate in its indications, and not liable to get out of order, and one in which the moving parts have a minimum amount of inertia.

It is a familiar scientific principle that a conductor stationed in a magnetic field if traversed by a current developing a field of force around the conductor at an angle to the line of flux of the magnetic field will have a tendency to move in the field. I utilize this principle in the construction of an electrical measuring instrument by mounting a spiral conductor, which may be in the form of a thin wire or ribbon one end of which is fixed to a stationary part of the instrument and the other to an arbor carrying an index-needle. The spiral conductor is placed in a dense magnetic field produced either by a permanent or electro magnet, and when traversed by a current the magnetic field in which it is located reacts upon the field of force around the conductor and the spiral dilates or contracts, according to the direction of the current, and produces a rotary effort on the arbor or pivot-post, which gives a deflection to the needle. In order to increase the rotary effect, two or more spiral conductors may be employed and a current may be led through them in parallel or in series relation, the field of force in which they are placed being so arranged with respect to the direction of current circulating in the spirals that a summative torque is produced on the needle. When arranged in series, the current may be carried inwardly toward the pivot-post on one spiral and outwardly from the same on the other and the several spirals be placed in independent fields in which the direction of flux is reversed. The independent fields may be afforded by a system of consequent poles produced in a permanent or electro magnet. Where the several spirals are connected in parallel, the current may be led through them in parallel to the pivot-post and carried from the same by a spiral spring or conductor. With the series arrangement of the spiral conductors the two spirals being secured to the arbor in opposite directions prevent derangement of accuracy in the instrument by reason of any change of temperature in the spirals, since any tendency of one coil to lengthen under rise of temperature will be compensated by a tendency in the opposite direction of the other, and yet with respect to the electromagnetic effects affecting indications on the instrument the efforts are summative. One great advantage afforded in an instrument of this type is the small inertia of the moving parts. The pointer may be made exceedingly light, and practically the only inertia is due to the pivot, which is the only massive part of the moving system, and as its weight lies close to the mathematical axis of revolution the inertia is very small. Another advantage of the organization is that the range of the instrument may be made as wide as desired, since the angle of deflection depends upon the length and cross-section of the spiral and the electromagnetic forces, the effort of the spirals to wind or unwind being continuous until the impelling force balances the retracting force. The range is not, therefore, limited, as in the ordinary type of instrument, to a maximum deflection of ninety degrees.

My invention comprises a current-carrying conductor mounted in a magnetic field having one end fixed to a stationary part of the apparatus and the other end connected to the index or pointer.

More specifically considered, it comprises a current-carrying spiral mounted in a magnetic field and arranged to give a deflection by a change of shape of the spiral under change of currents.

It comprises also other features, the novelty of which will be hereinafter more fully described, and definitely indicated in the claims appended to this specification.

Figure 2:
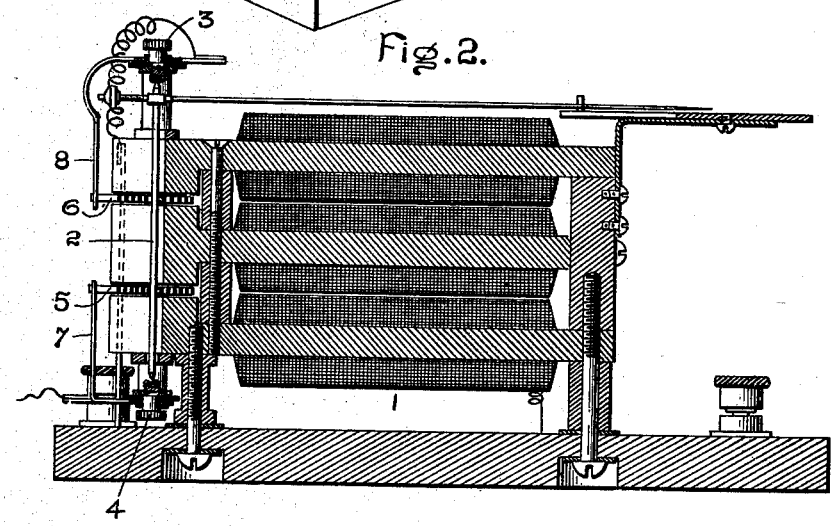
Figure 3:
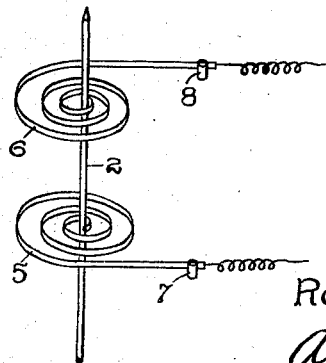
Figure 4:
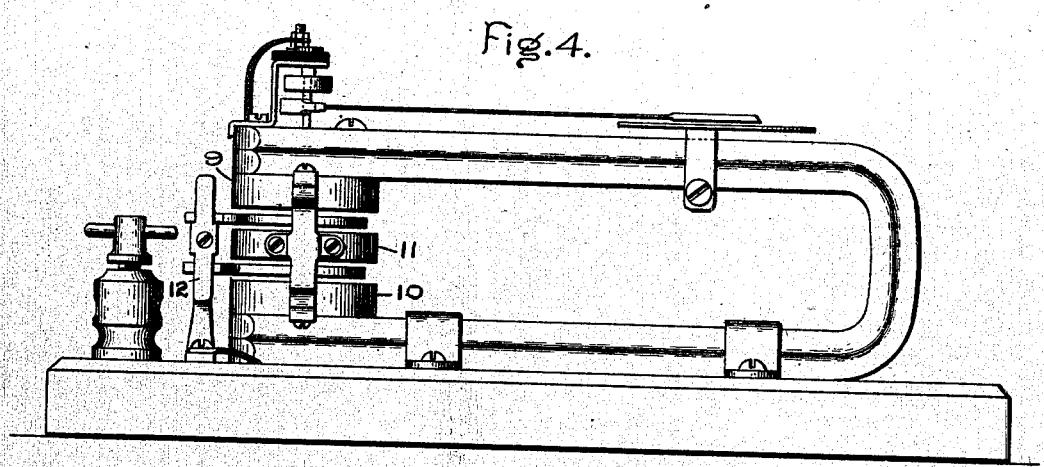
Figure 5:
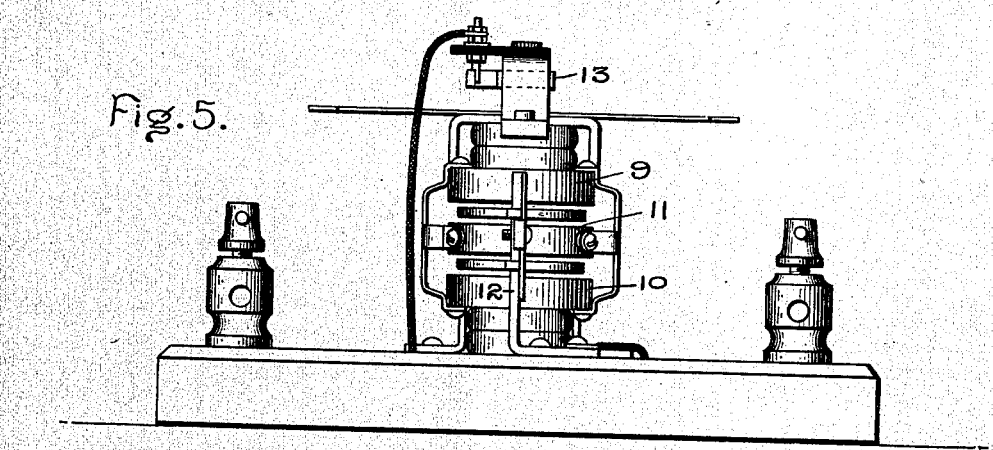

In the accompanying drawings, which illustrate my invention, Figure 1 is a perspective view of an ammeter embodying my improvements in which current is passed in series through two spiral conductors both secured to the rotary arbor carrying the index-needle. Fig. 2 is a central longitudinal section of this form of the instrument. Fig. 3 is a detail showing the arrangement of the spiral conductors and the index-arbor. Fig. 4 is a side elevation of another type of the instrument in which current is carried in parallel through two spiral conductors. Fig. 5 is an end view of this type, and Fig. 6 is a detail showing the arrangement of the spiral conductors and needle-arbor.

Referring first to the type shown in Figs. 1, 2, and 3, 1 represents an electromagnet having three legs, so as to develop a consequent pole between two opposite poles having the same sign. The magnet might also be formed from two permanent magnets having two similar poles placed in contact. The poles of the magnet are bored with a small hole to accommodate an arbor 2, mounted in jewel-bearings at the top and bottom carried in adjusting-screws 3 4. Between the two pairs of poles NS SN is formed a narrow gap in which are placed spiral conductors 5 6, having their outer ends fastened in fixed supports 7 8, mounted on insulating-supports around the jewel-posts and rotative therein when the posts are loosened to adjust the zero of the instrument. The inner ends of the spiral conductors are fixed to the arbor 2. The spiral conductors are mounted so that current in entering from the post 7 will flow around the arbor in the same direction through both spirals—that is to say, it has an anti-clockwise rotation in the conductor 6. It has a similar rotation in the conductor 5. With such an organization, the conductors 5 and 6 being in reverse fields, since the lines of force flow downwardly between the upper and middle pole-pieces and upwardly through the lower and middle pole-pieces, if the tendency of the spiral 6 is to open or dilate that of the spiral 5 will be to close or contract, and by reason of the outer ends of the spiral being fixed these two tendencies add together in rotating the index-arbor. With respect to the expansion of the springs under heat, however, the efforts of the two springs balance one another and the zero of the instrument is undisturbed. An instrument of this type gives nearly a proportional scale, while the range of the scale may be varied by change of length or stiffness of the spiral conductor. The large radiating-surface afforded by the ribbon conductors permits them to rapidly take the temperature due to any current passing. The resistance of the instrument is very low, and the index comes quickly to rest at the deflection corresponding to the current being measured. Where light currents are employed, the instrument should be supported in a vertical position to prevent tendency to sag of the conducting-spirals, a tendency which would produce frictional contact with the pole-faces and introduce a source of error. To prevent damage to the instrument from accidental contact from jarring or other causes, the pole-faces may be covered with a thin layer of mica or other insulation. The spiral conductors may be placed in parallel with a shunt, as common in many types of ammeters, and the electromagnets excited by a separate or by the same source.

Figure 6:
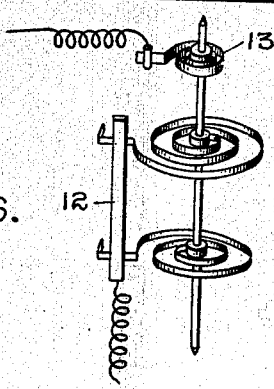

In the type of instrument shown in Figs. 4, 5, and 6 two permanent magnets are juxtaposed so as to form a compound magnet, on the poles of which are mounted annular iron pole-pieces 9 10, between which is supported on brass brackets an intermediate disk of iron 11. The spiral conductors are fixed in parallel relation to a post 12, the inner ends being fastened to the arbor, and current is led therefrom through a spiral retracting-spring 13. In this type of instrument the direction of the magnetic flux in the two fields is the same. The current is led to the two spirals in parallel with a common support 12 and passes out through the arbor and retracting-spring 13. In the type of instrument shown in Figs. 1, 2, and 3 the fields were reversed and current flowed through the two spirals in the same direction. In this case the current flows through the two spirals in reverse direction by reason of the multiple-arc relation, and the torque is therefore summative. In this instrument the winding effort on the spirals has two components, one due to attraction of parallel currents and the other due to the shifting of the current-carrying conductor in the magnetic field. In the case of the unwinding-spring this effort is a differential of the two components, the electromagnetic effort being in excess. The force of the component due to attraction of parallel currents may be varied by changing the pitch of the spirals.

What I claim as new, and desire to secure by Letters Patent of the United States, is—

1. An electric measuring instrument having a current-carrying conductor mounted for lateral movement in a narrow gap between the poles of a magnet, said conductor being fixed at one end and connected at the other with an indicating device.

2. An electric measuring instrument having an elastic current-measuring conductor mounted in a narrow gap between the poles of a magnet, both ends of said conductor having a solid connection with the leads of the circuit, and an indicator operated by movement of the conductor in the field.

3. An electric measuring instrument comprising a spiral current-measuring conductor crossing a narrow gap between two magnet-poles, having one end fixed and the other connected to an indicator.

4. An electric measuring instrument comprising a spiral electric conductor mounted in a narrow gap between two magnet-poles having its inner end connected to an indicator and its outer end secured to a fixed point.

5. An electric measuring instrument comprising a spiral conductor mounted between the poles of a magnet, a pivoted indicator secured to its inner or central end and a fixed point of attachment at the outer end.

6. A current-measuring instrument comprising a spiral current-carrying conductor mounted between the poles of a magnet, an arbor secured to its inner or central end extending through the poles of the magnet, a pointer secured to the arbor outside the poles of the magnet and a fixed point of attachment for the outer end of the spiral.

7. An electric measuring instrument comprising a spiral metal ribbon mounted in a magnetic field, having its inner or central end secured to a rotary indicator and its outer end secured to a fixed point.

8. A current-measuring instrument comprising a plurality of spiral conductors having one end of each connected with an indicator and the other end fixed, said conductors being oppositely wound so as to oppose each other under changes of stress due to change of temperature, and a plurality of magnetic fields inclosing the said conductors, the directions of flux of the several fields with respect to the direction of current being such as to provide a summative torque.

In witness whereof I have hereunto set my hand this 17th day of May, 1901.

ROBERT H. READ.

Witnesses:
BENJAMIN B. HULL,
FRED RUSS.